United States Patent
Hawkins (10) Patent No.: US 8,066,503 B2
(45) Date of Patent: Nov. 29, 2011

(54) CONTROLLED DELTA PRESSURE BULK RESIN INFUSION SYSTEM

(75) Inventor: Robert D. Hawkins, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 203 days.

(21) Appl. No.: 11/257,144

(22) Filed: Oct. 25, 2005

(65) Prior Publication Data

US 2007/0090562 A1     Apr. 26, 2007

(51) Int. Cl.
*B29C 70/04* (2006.01)
*B29C 70/44* (2006.01)

(52) U.S. Cl. ............... 425/389; 425/388; 425/405.1; 425/403; 425/504; 425/DIG. 60

(58) Field of Classification Search ............ 425/388, 425/390, 405.1, 504, DIG. 60, 389, DIG. 47, 425/380, 403
See application file for complete search history.

(56) References Cited

U.S. PATENT DOCUMENTS

| | | | |
|---|---|---|---|
| 4,233,008 A * | 11/1980 | Murray | 425/77 |
| 4,311,661 A * | 1/1982 | Palmer | 264/510 |
| 4,357,193 A * | 11/1982 | McGann et al. | 156/286 |
| 4,504,341 A * | 3/1985 | Radzwill et al. | 156/102 |
| 4,562,033 A * | 12/1985 | Johnson et al. | 264/510 |
| 4,622,091 A * | 11/1986 | Letterman | 156/286 |
| 4,816,106 A * | 3/1989 | Turris et al. | 156/285 |
| 4,902,215 A * | 2/1990 | Seemann, III | 425/406 |
| 4,915,896 A * | 4/1990 | Rachal et al. | 264/511 |
| 4,942,013 A * | 7/1990 | Palmer et al. | 264/511 |
| 5,116,216 A * | 5/1992 | Cochran et al. | 425/504 |
| 5,123,985 A * | 6/1992 | Evans et al. | 156/213 |
| 5,129,813 A * | 7/1992 | Shepherd | 425/504 |
| 5,281,388 A * | 1/1994 | Palmer et al. | 264/571 |
| 5,403,537 A * | 4/1995 | Seal et al. | 264/511 |
| 5,441,692 A * | 8/1995 | Taricco | 264/571 |
| 5,576,030 A * | 11/1996 | Hooper | 425/112 |
| 5,601,852 A * | 2/1997 | Seemann | 425/112 |
| 5,665,301 A * | 9/1997 | Alanko | 264/571 |
| 5,702,663 A * | 12/1997 | Seemann | 264/510 |
| 5,772,950 A * | 6/1998 | Brustad et al. | 264/510 |
| 5,834,082 A * | 11/1998 | Day | 428/56 |
| 5,960,487 A * | 10/1999 | Hawkins et al. | 4/449 |
| 5,968,445 A * | 10/1999 | McCarville et al. | 264/571 |
| 6,009,635 A * | 1/2000 | Vidaurre et al. | 34/92 |
| 6,090,335 A * | 7/2000 | McClure et al. | 264/510 |
| 6,101,641 A * | 8/2000 | Hawkins et al. | 4/484 |
| 6,125,667 A * | 10/2000 | Vidaurre H. et al. | 68/5 D |
| 6,218,458 B1 * | 4/2001 | Vidaurre et al. | 524/494 |
| 6,391,436 B1 * | 5/2002 | Xu et al. | 428/298.1 |
| 6,406,659 B1 * | 6/2002 | Lang et al. | 264/510 |
| 6,482,497 B1 | 11/2002 | Kay et al. | |
| 6,495,088 B1 * | 12/2002 | Coffin et al. | 264/510 |
| 6,506,325 B1 * | 1/2003 | Cartwright | 264/40.6 |
| 6,537,483 B1 * | 3/2003 | Cartwright et al. | 264/511 |
| 6,555,045 B2 * | 4/2003 | McClure et al. | 264/510 |

(Continued)

*Primary Examiner* — Joseph Del Sole
*Assistant Examiner* — Seyed Masoud Malekzadeh (57) ABSTRACT

A composite item is fabricated in a device for infusing a layup. The device include a mandrel, vacuum cup and bagging film. The mandrel is to receive the layup. The mandrel includes a reinforcement receiving zone and a resin receiving zone substantially adjacent to the reinforcement receiving zone. The vacuum cup is in cooperative alignment with the resin receiving zone. The bagging film is to generate a gas tight envelope surrounding the reinforcement receiving zone and the resin receiving zone. The vacuum cup is sealed upon the bagging film to generate a chamber above the resin receiving zone.

13 Claims, 5 Drawing Sheets

U.S. PATENT DOCUMENTS

| | | | |
|---|---|---|---|
| 6,585,839 B2 * | 7/2003 | Woods et al. | 156/73.1 |
| 6,814,563 B2 * | 11/2004 | Amnered et al. | 425/389 |
| 6,818,159 B2 * | 11/2004 | Hinz | 264/40.6 |
| 6,843,953 B2 * | 1/2005 | Filsinger et al. | 264/510 |
| 6,869,561 B2 * | 3/2005 | Johnson et al. | 264/510 |
| 6,918,985 B2 * | 7/2005 | Geyer | 156/285 |
| 6,964,561 B2 * | 11/2005 | Louderback et al. | 425/129.1 |
| 7,112,299 B2 * | 9/2006 | Merrick | 264/510 |
| 7,138,028 B2 * | 11/2006 | Burpo et al. | 156/245 |
| 7,147,818 B1 * | 12/2006 | Rigas et al. | 264/510 |
| 7,189,345 B2 * | 3/2007 | Sewell et al. | 264/101 |
| 7,334,782 B2 * | 2/2008 | Woods et al. | 264/510 |
| 7,413,694 B2 * | 8/2008 | Waldrop et al. | 264/257 |
| 2001/0006991 A1 * | 7/2001 | Vidaurre et al. | 524/494 |
| 2001/0009313 A1 * | 7/2001 | McClure et al. | 264/316 |
| 2002/0020934 A1 * | 2/2002 | Hinz | 264/40.6 |
| 2002/0022422 A1 * | 2/2002 | Waldrop et al. | 442/179 |
| 2002/0098335 A1 * | 7/2002 | Winget et al. | 428/292.1 |
| 2002/0155186 A1 * | 10/2002 | Walsh | 425/110 |
| 2003/0011094 A1 * | 1/2003 | Filsinger et al. | 264/102 |
| 2003/0025232 A1 * | 2/2003 | Slaughter et al. | 264/102 |
| 2003/0211194 A1 * | 11/2003 | Louderback et al. | 425/389 |
| 2003/0227107 A1 * | 12/2003 | Stewart | 264/236 |
| 2004/0017020 A1 * | 1/2004 | Loving | 264/134 |
| 2004/0032062 A1 * | 2/2004 | Slaughter et al. | 264/511 |
| 2004/0084806 A1 * | 5/2004 | Biermann et al. | 264/319 |
| 2004/0113315 A1 * | 6/2004 | Graham | 264/266 |
| 2004/0265406 A1 * | 12/2004 | Lorenz et al. | 425/110 |
| 2005/0031843 A1 * | 2/2005 | Robinson et al. | 428/293.4 |
| 2005/0035478 A1 * | 2/2005 | Sewell et al. | 264/102 |
| 2005/0040553 A1 * | 2/2005 | Slaughter et al. | 264/40.1 |
| 2005/0048260 A1 * | 3/2005 | Modin et al. | 428/138 |
| 2005/0073076 A1 * | 4/2005 | Woods et al. | 264/511 |
| 2005/0118939 A1 * | 6/2005 | Duescher | 451/527 |
| 2005/0253309 A1 * | 11/2005 | Hou et al. | 264/571 |
| 2006/0027314 A1 * | 2/2006 | Jones et al. | 156/245 |
| 2006/0065656 A1 * | 3/2006 | Weerth | 220/88.1 |
| 2006/0068170 A1 * | 3/2006 | Hanson | 428/174 |
| 2006/0076350 A1 * | 4/2006 | Weerth | 220/88.1 |
| 2006/0103045 A1 * | 5/2006 | O'Brien-Bernini et al. | 264/45.9 |
| 2006/0233907 A1 * | 10/2006 | Ruiz et al. | 425/387.1 |
| 2007/0090562 A1 * | 4/2007 | Hawkins | 264/257 |
| 2007/0152379 A1 * | 7/2007 | Jacobson | 264/500 |

* cited by examiner

CONTROLLED DELTA PRESSURE BULK RESIN INFUSION SYSTEM

FIELD OF THE INVENTION

The present invention generally relates to a resin infusion device. More particularly, the present invention pertains to a vacuum assisted resin infusion device.

BACKGROUND OF THE INVENTION

Laminated materials such as, for example, composites are widely utilized to increase structural rigidity in a wide variety of products. For example, composites are generally utilized by the airplane construction industry to build airframes, structural members of airframes, wings, wing spars, and the like. In some of the most advanced aircraft, where high strength and rigidity and low weight are extremely important, composites may account for a significant portion of the airframe as well as the external surface or skin. Typically, these composites are constructed from a plurality of layers placed over a form. These layers are often referred to as partial or full plies. Each ply may be in the form of unidirectional fiber material, woven fibers in a fabric, braided, or a variety of other conformations. Plies of unidirectional fiber material are often placed in several direction or strand orientations such as, 0°, 90°, ±45°, and the like. The fibers may be made from any of a multitude of natural and/or "man-made" materials such as fiberglass, graphite, Kevlar®, and the like.

In a "dry layup," the plies of reinforcing material are placed on a form or mandrel and then saturated with a resin such as epoxy. If an excess of epoxy is present in the layup, the plies may "float" off the mandrel or create layers or pockets of epoxy that add weight to the layup without adding significant strength. However, if the plies are insufficiently saturated with epoxy, internal and/or external voids may occur. Such voids may result in undesirable material strength properties and/or surface imperfections. While conventional methods and devices have been employed to overcome these issues, these conventional solutions have not been fully successful.

Accordingly, it is desirable to provide a system, apparatus and method for infusing resin into a layup that is capable of overcoming the disadvantages described herein at least to some extent.

SUMMARY OF THE INVENTION

The foregoing needs are met, to a great extent, by the present invention, wherein in one respect a system, apparatus and method is provided that in some embodiments facilitates infusing a resin into a layup.

An embodiment of the present invention relates to a mandrel including a reinforcement receiving zone and resin receiving zone substantially adjacent to the reinforcement receiving zone.

Another embodiment of the present invention pertains to a device for infusing a layup. The device include a mandrel, vacuum cup and bagging film. The mandrel is to receive the layup. The mandrel includes a reinforcement receiving zone and a resin receiving zone substantially adjacent to the reinforcement receiving zone. The vacuum cup is in cooperative alignment with the resin receiving zone. The bagging film is to generate a gas tight envelope surrounding the reinforcement receiving zone and the resin receiving zone. The vacuum cup is sealed upon the bagging film to generate a chamber above the resin receiving zone.

Yet another embodiment of the present invention relates to a system for fabricating a composite item. The system includes a layer of reinforcement corresponding to the composite item, supply of resin sufficient to infuse the reinforcement, mandrel, vacuum cup, and bagging film. The mandrel includes a reinforcement receiving zone to receive the layer of reinforcement and a resin receiving zone substantially adjacent to the reinforcement receiving zone. The vacuum cup is in cooperative alignment with the resin receiving zone. The bagging film is to generate a gas tight envelope surrounding the reinforcement receiving zone and the resin receiving zone. The vacuum cup is sealed upon the bagging film to generate a chamber above the resin receiving zone.

Yet another embodiment of the present invention pertains to an apparatus for fabricating a composite aircraft component on a mandrel having a reinforcing zone and a resin zone. The apparatus includes a means for generating an amount of compressive force on the resin and means for controlling the amount of compressive force.

Yet another embodiment of the present invention relates to a method of fabricating a composite aircraft component on a mandrel having a reinforcing zone and a resin zone. In this method, an amount of compressive force on the resin zone is generated and the amount of compressive force is controlled.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

The present invention provides a controlled delta pressure vacuum assisted bulk resin infusion (BRI) system, device, and method. In some embodiments, the BRI system includes a form or mandrel to retain a layup. The layup includes at least one ply of reinforcement, parting film, and infusion media. The BRI system includes a gas tight or substantially gas impermeable membrane that envelopes the layup. In response to a pressure differential across the membrane, compressive force is exerted upon the layup. This process is typically referred to as "vacuum bagging." However, increasing ambient pressure outside the envelope may also be utilized. The term, "bulk resin infusion" as used herein, refers to resin infusing the reinforcement at a relatively higher flow rate than convention systems and/or reducing restrictions to flow of resin into the reinforcement as compared to conventional systems. In an embodiment, this reduction in flow restriction and/or increased flow rate may be achieved by disposing the resin adjacent to the reinforcement and within the envelope. This method reduces or eliminates any tubing systems utilized to convey the resin from a holding chamber to the reinforcement and facilitates the use of relatively higher viscosity resins. Certain high viscosity resins exhibit material properties that may be advantageous in relatively high technology applications such as, for example, aerospace, racing, sports equipment, and the like.

In an embodiment, the rate at which resin is infused into the reinforcement is controlled by modulating the ambient pressure around a portion of the membrane that covers the resin relative to the ambient pressure around a portion of the membrane that covers the reinforcement. In this manner, the force of the membrane upon the resin may be controlled independently from the force of the membrane upon the reinforcement.

Resin formulations suitable for use with embodiments of the invention include thermoset resins that are solid or putty-like at room temperature. To decrease viscosity sufficiently to facilitate infusion, the resin may be heated. At this heating phase and/or in response to a decrease in pressure, entrapped bubbles and/or volatile solutions may "outgas" from the resin. If this out gassing were to occur within the reinforcement, voids or other such imperfections may result. By maintaining the ambient pressure above the resin at a relatively low level, the membrane may be held above the resin, allowing a volume through which gasses may escape prior to infusion.

Advantages of various embodiments of the invention include: (1) facilitates the use of relatively more viscous resin formulations; (2) decreases complexity of infusion system; (3) increases reliability; (4) facilitates out gassing of resins; (5) facilitates controlled infusion of resin into reinforcement; (6) decreasing occurrences of air pockets within the reinforcement and/or between the reinforcement and mandrel; and (7) reduces excess resin in the reinforcement caused by "floating" of the reinforcement.

Figure 1:
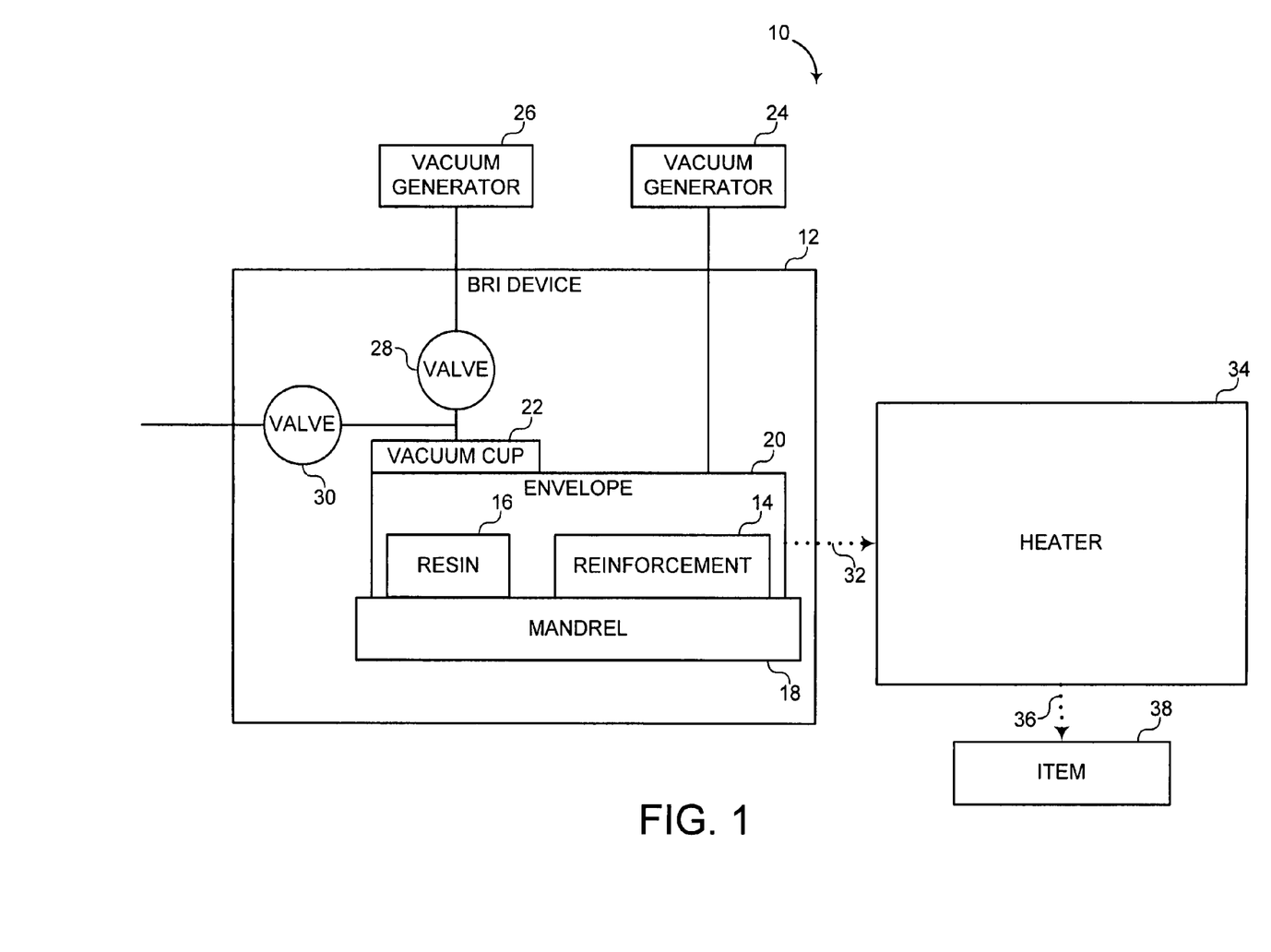
FIG. 1 is a block diagram of a bulk resin infusion system according to an embodiment of the invention.

The invention will now be described with reference to the drawing figures, in which like reference numerals refer to like parts throughout. As shown in FIG. 1, a vacuum assisted bulk resin infusion (BRI) system 10 includes a BRI device 12 to infuse a reinforcement 14 with a resin 16. The BRI device 12 includes a mandrel 18, envelope 20, and vacuum cup 22. The mandrel 18 includes a surface upon which the reinforcement 14 is placed and provides a mold to which the reinforcement 14 may conform to. The reinforcement 14 is compressed upon the mandrel 18 in response to a pressure differential across the envelope 20. This pressure differential is such that an interior of the envelope 20 is at a relatively lower pressure than an exterior of the envelope 20. For example, a vacuum generator 24 in fluid connection with the envelope 20 may be configured to remove a portion of air and/or gasses from the envelope 20. In this manner ambient air pressure may exert a force upon the envelope 20.

The vacuum cup 22 facilitates controlling the amount of compressive force the envelope 20 exerts on the resin 16. In general, the vacuum cup 22 is disposed in cooperative alignment with the resin 16. For example, the vacuum cup 22 is disposed upon the envelope 20 at a portion of the envelope 20 that is above the resin 16. The vacuum cup 22 is in fluid communication with a vacuum generator 26 that may be controlled to remove a portion of the atmosphere from above the resin 16. In this manner, action of the vacuum cup 22 reduces or prevents the envelope 20 from exerting a compressive force upon the resin 16.

The BRI device 12 optionally includes one or more valve such as valves 28 and 30. If present, the valves 28 and 30 are configured to control the amount of vacuum pressure within the vacuum cup 22. For example, by closing the valve 30 and opening the valve 28, the pressure within the vacuum cup 22 may be reduced by the vacuum generator 26. In another example, by closing the valve 28 and opening the valve 30, air at ambient pressure may be allowed to enter the vacuum cup 22. If the pressure in the vacuum cup 22 is less than the ambient pressure, the pressure within the vacuum cup 22 may be raised by the ingress of air.

According to various embodiments, the resin 16 is a thermoset type resin that is cured in response to being subjected to an elevated temperature and/or pressure. In this regard, the BRI device 12 may be heated 32 by a heater 34. In a particular example, the resin 16 is substantially solid or putty-like at room temperature prior to being cured. In response to being heated to a predetermined temperature and/or for a predetermined time, viscosity of the resin 16 is, initially, reduced such that the resin 16 is operable to flow into or infuse the reinforcement 14. In response to further elevating the temperature and/or an extended curing period, the viscosity of the resin 16 is increased and the resin 16 solidifies due to an essentially irreversible chemical polymerization reaction.

In various embodiments, the heater 34 is configured to raise the temperature of the resin 16 or otherwise impart thermal energy into the resin 16. The heater 34 may include any suitable heating device such as, for example, a heating element, infra red (IR) heater, oven, autoclave, and the like. In a particular example, the heater 34 is an oven having an interior volume sufficiently large to contain the BRI device 12. In another example, the heater 34 is an autoclave having a pressure chamber with sufficient volume to contain the BRI device 12 and operable to increase the temperature and/or ambient pressure within the pressure chamber. Following heating, the BRI device 12 may be removed 36 from the heater 34 or otherwise allowed to cool.

As a result of the infusion and any curing procedures, a composite item 38 is generated. The composite item 38 includes any suitable item or part such as, for example, "C-channels" and other structural members, wing spars, fuselage frames, panels, and the like.

Figure 2:
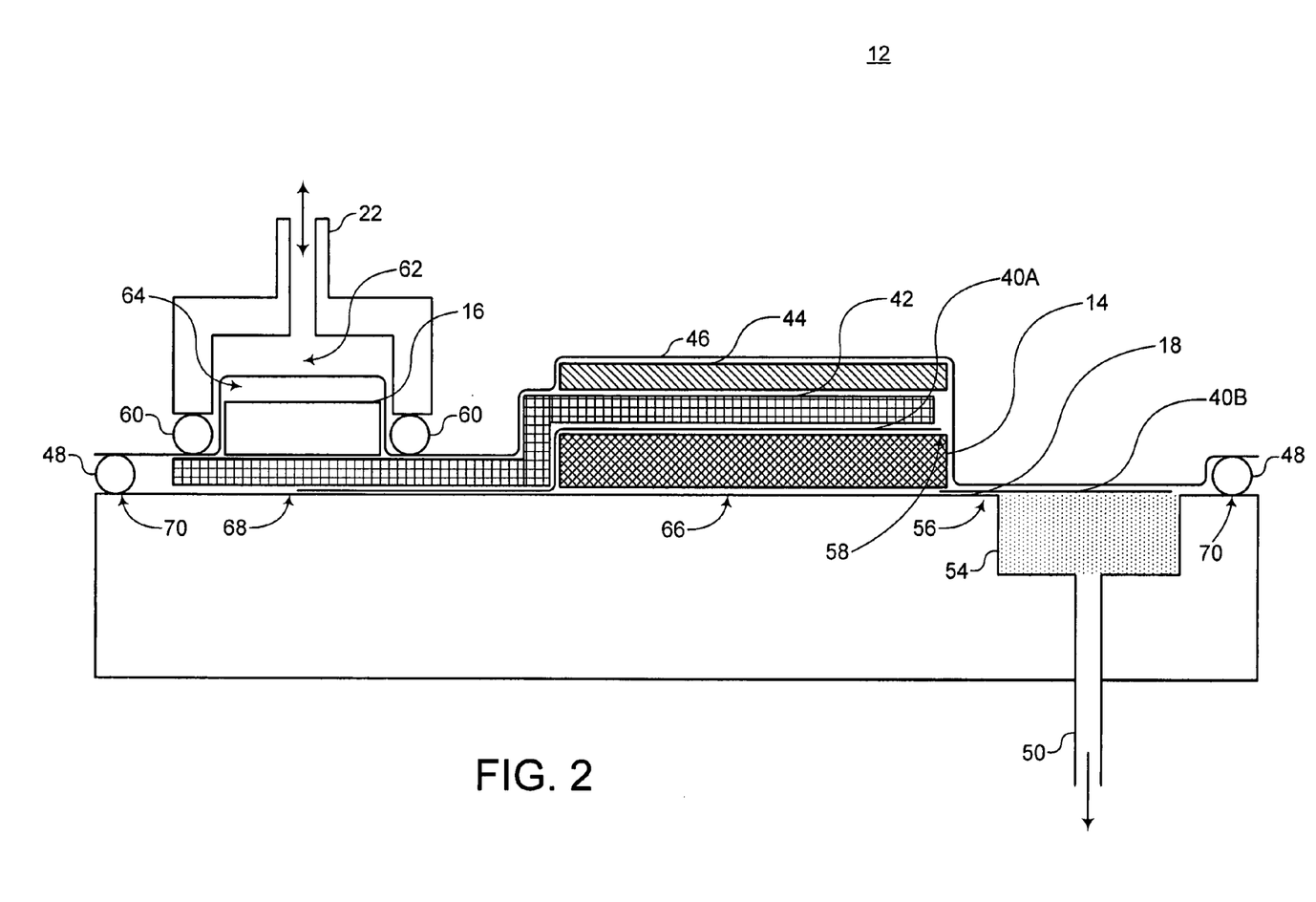
FIG. 2 is a cross-sectional view of a bulk resin infusion device suitable for use with the bulk resin infusion system according to FIG. 1.

FIG. 2 is a cross-sectional, view of the BRI device 12 suitable for use with the BRI system 10. As shown in FIG. 2, the BRI device 12 includes the reinforcement 14, resin 16 and the mandrel 18. In addition, the BRI device 12 includes parting films 40A and 40B, infusion media 42, optional caul plate 44, bagging film 46, sealant 48, vacuum port 50, and exit breather 54.

The parting films 40A and 40B include any suitable release film or peel ply operable to reduce adhesion of the cured item 38 to the various other components of the BRI device 12. Generally, suitable parting films include those that do not appreciably adhere to the resin 16. Suitable parting films may facilitate a flow of liquidus resin across the parting film. In a particular example, the parting films 40A and 40B are a Teflon® coated woven fiberglass layer such as Armalon®. As shown in FIG. 2, the parting film 40A is disposed to cover at least a portion of the reinforcement 14. In a particular example, the parting film 40A is "held back" from an edge of the reinforcement 14 that is relatively close to the exit breather 54 to induce the resin 16 to flow through the reinforcement 14. Also shown in FIG. 2, the parting film 40B is disposed to cover at least some portion of the exit breather 54 and may extend slightly under the reinforcement 14.

The infusion media 42 facilitates flow of the resin 16 into the reinforcement from a position relatively to one side of the reinforcement. In this regard, the infusion media 42 includes a relative coarsely woven or non-woven layer.

The caul plate 44 is optionally included to facilitate modification of surface characteristics. If present, the caul plate 44 may include a relatively stiff or rigid material having a lower surface that is drawn toward an upper surface of the reinforcement. In this manner, the upper surface of the reinforcement may be modified to essentially correspond to the lower surface of the caul plate 44.

The bagging film 46 is a gas tight or essentially gas impermeable membrane to facilitate generating a pressure differential. That is, when sealed upon the mandrel 18, the bagging film 46 forms the envelope 20 (See FIG. 1) inclosing the reinforcement 14 and the resin 16 and, to a sufficiently large extent, prevents air and/or gasses from passing therethrough. Generally, the bagging film 46 includes any suitably impermeable membrane, layer, or barrier. Suitable materials from which the bagging film may be made include plastics, rubbers, resins, and the like. Air and/or other gasses drawn from the envelope 20 generates a pressure differential that exerts a compressive force upon the contents of the envelope 20.

The sealant 48 facilitates generating a gas tight or substantially gas impermeable seal between the bagging film 46 and the mandrel 18. In various embodiments, the sealant 48 includes any suitable sealing material and/or method. Examples of suitable sealing materials and/or methods includes sticky, tacky and other such adhesive tapes or cordage, heat sealing, elastomeric seals, and the like. In other embodiments, the sealant 48 is optional and may be omitted. For example, the vacuum film 46 may include a bag, reusable bag, or other such envelope that the BRI device 12 is placed in.

The vacuum port 50 facilitates removal of some or all of the atmosphere from the envelope 20. For example, the vacuum port 50 may be fluidly attached to the vacuum generator 24. In this manner, air and/or other gasses may be drawn out from within the envelope 20 by the vacuum generator 24.

The exit breather 54 facilitates removal of the atmosphere from the BRI device 12 by increasing the surface area from which gasses are removed via the vacuum port 50. In a particular example, the exit breather 54 includes a porous fabric, woven fiberglass tape, metal or ceramic material.

To reduce any likelihood of resin being drawn into the exit breather 54, the BRI device 12 includes a choke zone 56 or other such region disposed between the reinforcement 14 and the exit breather 54. The reinforcement 14 is held back from the choke zone 56. To facilitate movement of air and/or gasses from the reinforcement 14 to the exit breather 54, the parting film 40B is placed to extend across the choke zone 56 and cover most or all of the exit breather 54. To facilitate drawing the liquidus resin 16 from the infusion media 42 and into the reinforcement 14, the BRI device 12 optionally includes a dead zone 58. By holding the infusion media 42 back a suitable distance from an edge of the reinforcement 14, the liquidus resin 16 is drawn or forced from the infusion media 42 into the reinforcement 14. In addition, by holding the parting film 40A back a suitable distance from the edge of the reinforcement 14 and/or extending the parting film 40B a suitable distance under the edge of the reinforcement 14, the liquidus resin 16 is drawn or forced into the reinforcement 14.

The BRI device 12 further includes a sealant 60 that may be similar to the sealant 48. The sealant 60 facilitates the generation of a seal between the vacuum cup 22 and the bagging film 46. More particularly, the sealant 60 may disposed about a perimeter of the resin 16 to facilitate sealing the vacuum cup 22 over the resin 16. As show in FIG. 2, the vacuum cup 22 includes a chamber 62. By modulating a pressure within the chamber 62 ($P_{chamber}$) relative to a pressure within the envelope 20 ($P_{envelope}$), a force ($F_{bf}$) exerted by the bagging film 46 upon the resin 16 may be controlled. For example, by modulating the $P_{chamber}$ to essentially coincide with the $P_{envelope}$, the $F_{bf}$ may be substantially zero. In another example, by maintaining a negative pressure differential or negative Δ pressure of the $P_{chamber}$ relative to the $P_{envelope}$, the bagging film 46 may be drawn away from the resin 16 to generate an out gassing pocket 64. In this regard, the $P_{envelope}$ is essentially equal to a pressure within the out gassing pocket 64 ($P_{pocket}$). By modulating the $P_{chamber}$ relative to the $P_{envelope}$ (e.g., $P_{pocket}$) to generate a positive Δ pressure, the resin 16 may be urged out from under the vacuum cup 22 and into the reinforcement 14 while still maintaining a level of compaction upon the reinforcement.

The out gassing pocket 64 provides a volume for any out gassed products and/or provides some "head space" for bubbles, that rise to the surface of the resin during out gassing, to break in. In addition, a separate exit breather may be included to remove any gasses and/or bubbles.

The reinforcement zone 66 provides a surface, upon which, the reinforcement 14 may be disposed. The reinforcement zone 66 may be configured to correspond to a surface of the item 38. In addition, the reinforcement zone 66 may be surfaced as appropriate. For example, a release coating may be applied to the reinforcement zone 66 to facilitate removal of the item 38. In another example, the reinforcement zone 66 may be polished or otherwise surfaced to facilitate layup and/or release of the item 38.

The resin zone 68 facilitates placement of the resin 16 adjacent or relatively near to the reinforcement 14. As shown in FIG. 2, the resin zone 68 abuts, or nearly abuts the reinforcement zone 66 and is fluidly connected to the reinforcement zone 66 via the infusion media and/or the parting film 40A.

To prepare the BRI device 12 for operation, the various components of the BRI device 12 are positioned, one upon the other in a manner similar to that illustrated in FIG. 2. In operation, the BRI device 10 includes the gas tight envelope 20 (See FIG. 1) that surrounds the reinforcement 14, resin 16, and various layers. Gasses are drawn from the envelope 20 via the exit breather 54 and a depressurized volume is formed within the envelope 20. Any ambient pressure present outside of the envelope 20 acts to press the bagging film 46 upon the components within the envelope 20. Resilience of the reinforcement 14, infusion media 42, etc. tend to resist this compressive force. Upon sufficient reduction in the viscosity of the resin 16 and a positive Δ pressure, the resin 16 is drawn or forced into the infusion media 42, across the parting film 40A and into the reinforcement 14.

Figure 3:
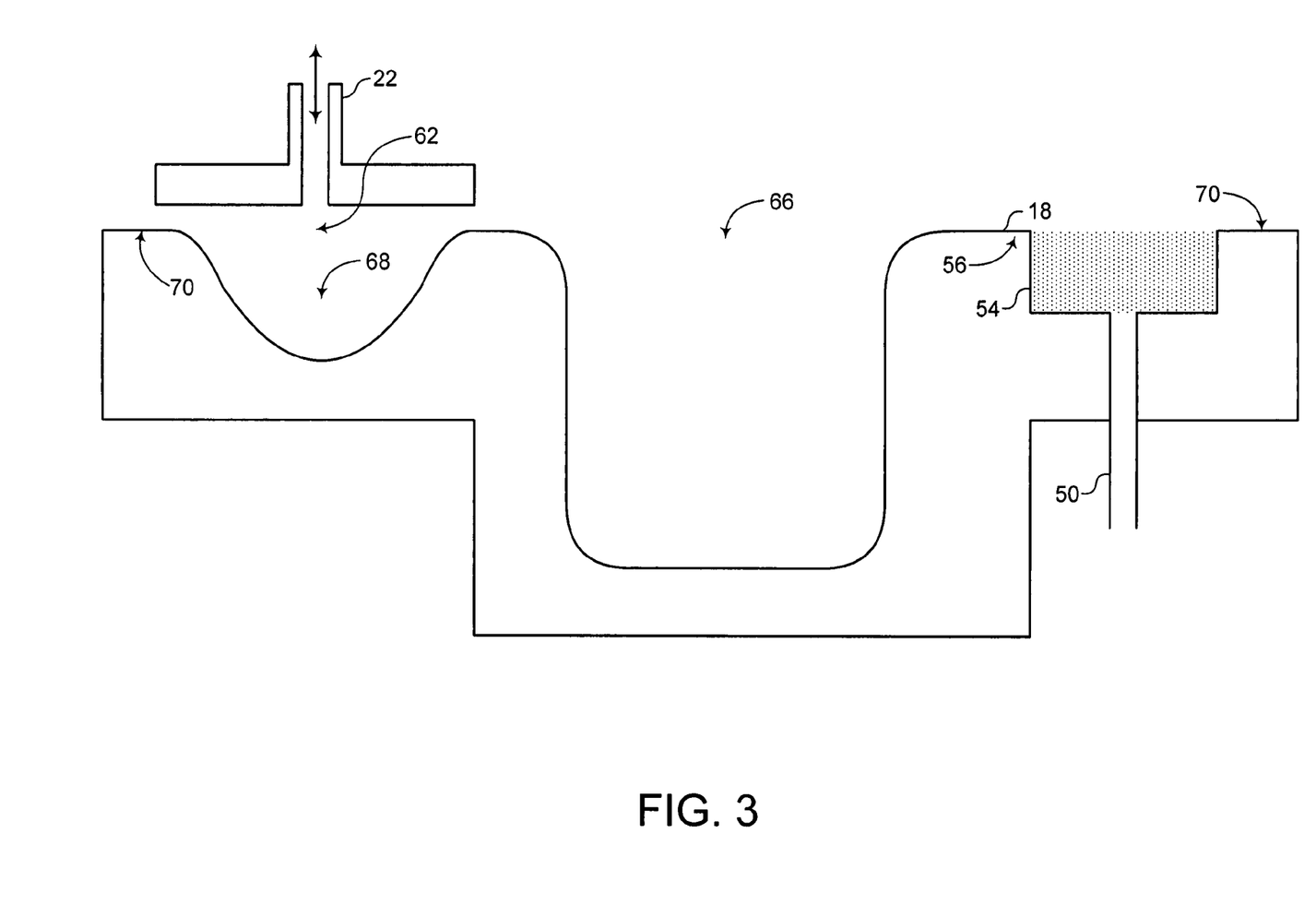
FIG. 3 is a cross-sectional view of a mandrel suitable for use with the bulk resin infusion system according to FIG. 1.

FIG. 3 is a cross-sectional view of the mandrel 18 suitable for use with the BRI system 10 according to FIG. 1. The mandrel 18 of FIG. 3 is similar to the mandrel 18 of FIG. 2, and thus, in the interest of brevity, those items described in FIG. 2, will not be described again in FIG. 3. As shown in FIG. 3, the mandrel 18 includes the reinforcement zone 66 that corresponds to the item 38. More particularly, the item 38 is a "C" channel and the reinforcement zone 66 includes a female mold that corresponds to the "C" channel profile. In addition, the mandrel 18 includes the resin zone 68 that includes a concavity or depression to facilitate retaining the resin 16 prior to and/or during infusion of the reinforcement 14. Furthermore, the vacuum cup 22 of the embodiment of FIG. 3 is essentially flat. In other embodiments, the essentially flat vacuum cup 22 includes an undercut, scalloping, or slight hollowing on or near an edge proximal to the reinforcement 14. In this manner, compressive force of the vacuum cup 22 upon the infusion media 42 (See FIG. 2) is reduced and, thus, restrictions to the flow of the resin 16 are reduced accordingly.

According to an embodiment of the invention, the infusion media 42 (See FIG. 2) may be disposed relatively above the resin 16. It is an advantage of this embodiment that positioning the infusion media 42 above the resin in the resin zone 68 allows the melted resin 16 to remain in the resin zone 68 while gasses flow out through the infusion media 42, so long as relatively lower pressure is maintained within the chamber 62 as compared to the envelope 20.

Figure 4:
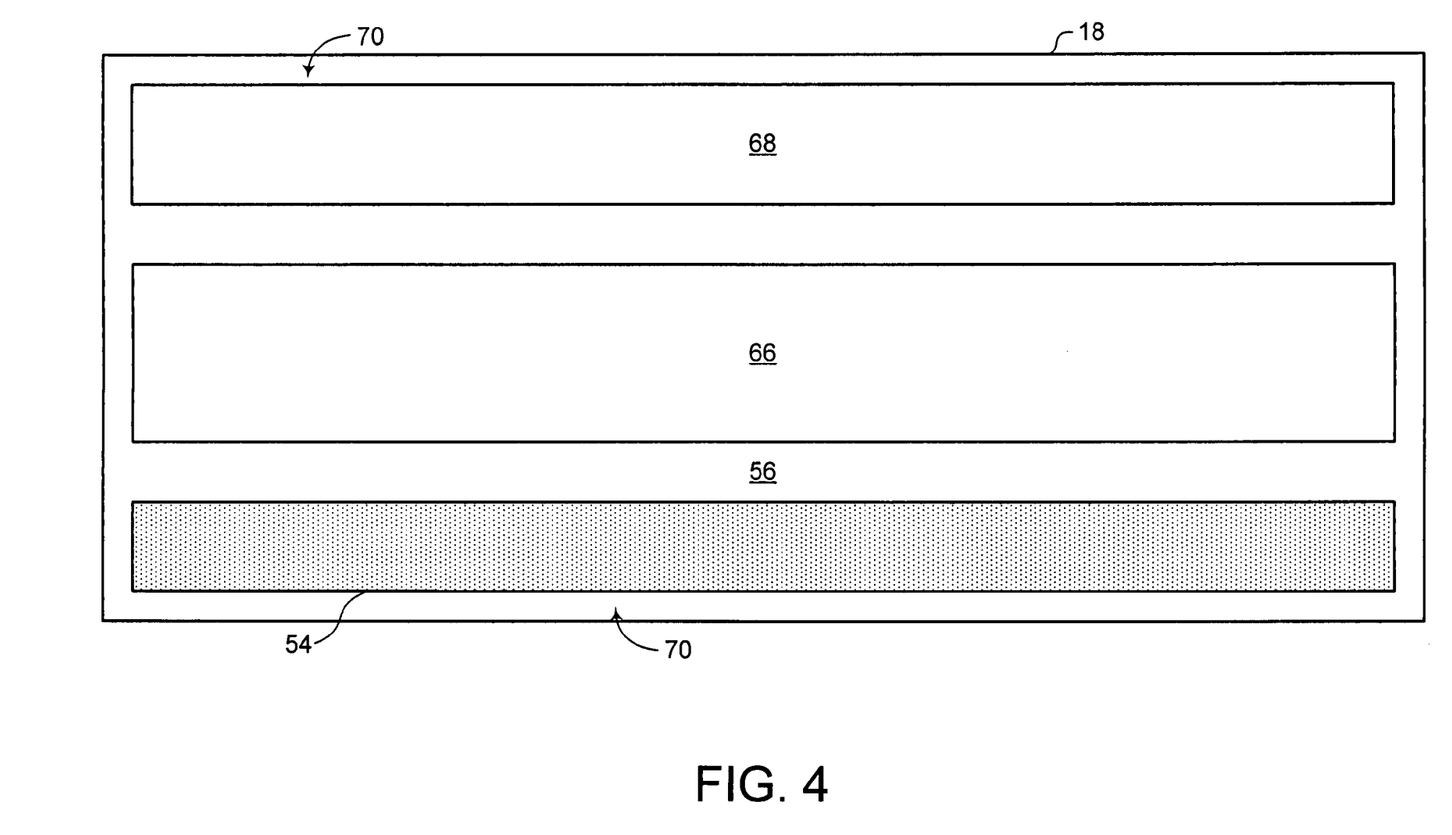
FIG. 4 is a top view of the mandrel 18 suitable for use with the BRI system 10 according to FIG. 1.

FIG. 4 is a top view of the mandrel 18 suitable for use with the BRI system 10 according to FIG. 1. The mandrel 18 of FIG. 4 is similar to the mandrel 18 of FIGS. 2 and 3, and thus, in the interest of brevity, those items described in FIGS. 2 and 3, will not be described again in FIG. 4. As shown in FIG. 3, the mandrel 18 includes the reinforcement zone 66 that corresponds to the item 38. More particularly, reinforcement zone 66 is relatively long to facilitate fabrication of the item 38. In addition, the resin zone 68 abutting the reinforcement zone 66 includes a similar length to facilitate infusion of the resin 16 into the reinforcement 14. Furthermore, the exit breather 54 optionally includes a length similar to the reinforcement zone 66 to facilitate a relatively even draw of air and/or gasses from the envelope 20 and, thus, a relatively even flow of the resin 16 across and into the reinforcement 14.

Figure 5:
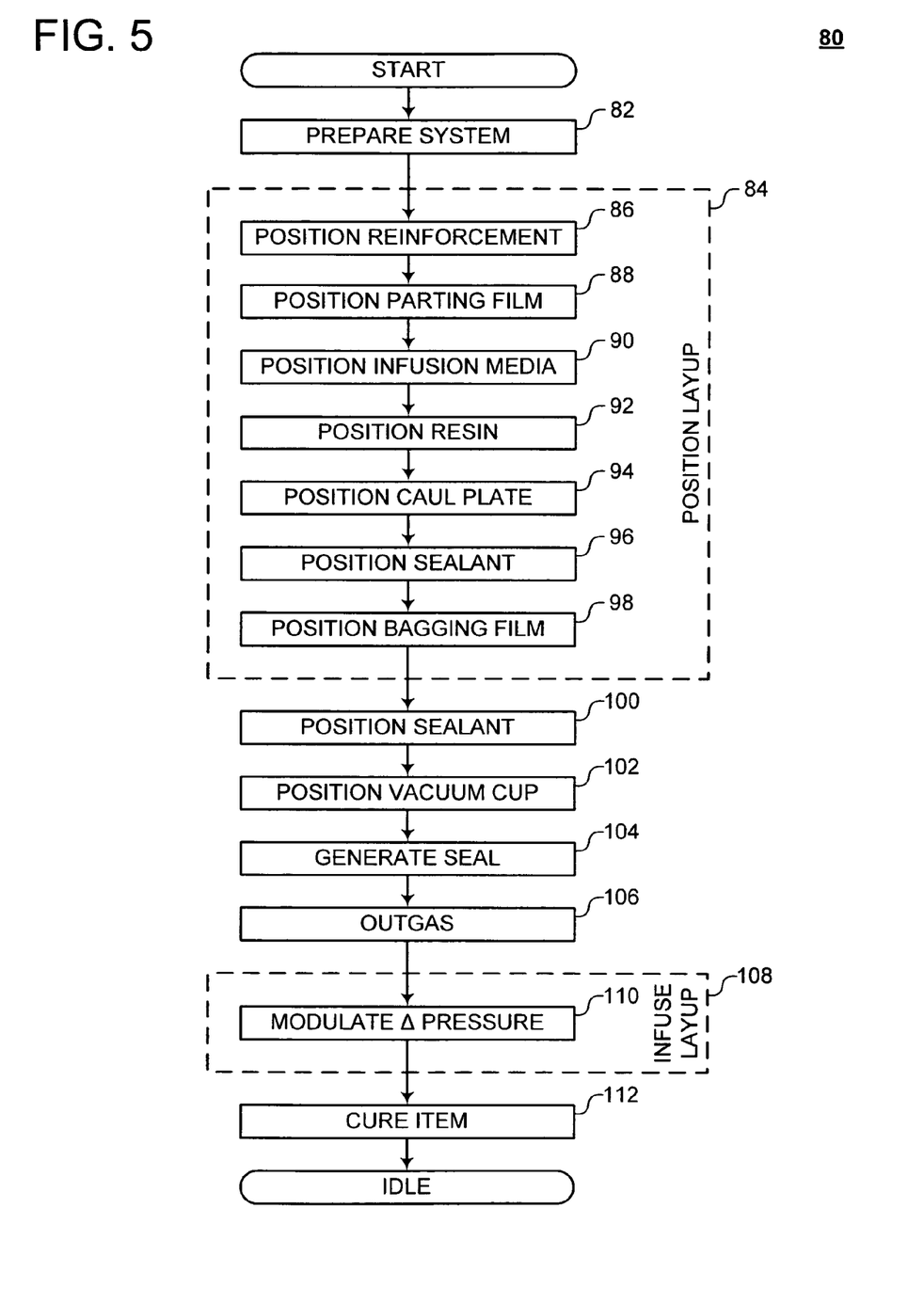
FIG. 5 is a flow diagram illustrating steps that may be followed in accordance with an embodiment of the method or process.

FIG. 5 illustrates steps involved in a method 80 of infusing the reinforcement 14 with the resin 16 to fabricate the item 38. Prior to the initiation of the method 80, the item 38 is designed and a series of computer readable instructions specifying attributes of the composite product is generated. These instructions are utilized to generate the mandrel 18. In addition, the various components of the BRI system 10 are gathered and prepared for the infusion process.

At step 82, the BRI system 10 is prepared. For example, the mandrel 18 may be prepared for the infusion process by applying a release coating to any surfaces that may come into contact with the resin 16. In addition, vacuum lines may be attached to the vacuum port 50 and vacuum generator 24.

At step 84, the layup is positioned. In general, positioning the layup includes positioning the reinforcement 14 and the various other layers on or in a designated surface of the mandrel 18. In addition, the resin 16 may be positioned at step 84 or another step. More particularly, steps 86 to 98 describe procedures performed during layup positioning.

At step 86, the reinforcement 14 is positioned. For example, one or more plies or layers of fibrous material are placed on the reinforcement zone. The plies may include fabric, unidirectional, and/or non-woven fibrous material. The material of the fibers may include glass, carbon, Kevlar®, polymers, aramid, and/or other such fibers. In addition, the plies may include strips that are, themselves, woven prior to or during placement on the mandrel 18.

At step 88, the parting films 40A and/or 40B are positioned. For example, the parting film 40A is disposed upon the reinforcement 14 and the parting film 40 B is disposed upon at a least a portion of the exit breather 54. The parting film 40A may additionally be disposed upon some portion of the resin zone 68, the mandrel 18 intervening between the reinforcement zone 66 and the resin zone 68, and/or reinforcement zone 66. The parting film 40B may additionally be disposed upon some portion of the mandrel 18 intervening between the reinforcement zone 66 and the exit breather 54. Furthermore, the steps 86 to 98 need not be performed in any particular order, but rather, may be performed in any suitable order. For example, the parting film 40B may be positioned prior to the reinforcement 14 to facilitate disposing an edge of the parting film 40B relatively below an edge of the reinforcement 14.

At step 90, the infusion media 42 is positioned. For example, the infusion media 42 may be positioned so as to cover some portion of the reinforcement 14. In a particular example, the dead zone 58 is generated by leaving a relatively narrow portion of the reinforcement 14 uncovered by the infusion media 42. In this manner, a flow of the resin 16 across the infusion media 42 may be directed into the reinforcement 14. The infusion media 42 may further be disposed upon some portion or abutting the resin zone 68. In this manner, the infusion media 42 may facilitate transport of the resin 16 from the resin zone 68, across the reinforcement 14, and towards the exit breather 54.

At step 92, the resin 16 is positioned. For example, the resin 16 is positioned upon the resin zone 68. It is an advantage of various embodiments of the invention that, the position of the resin 16 adjacent to the reinforcement 14 facilitates the use of a broad range of resins, including those that are too viscous for use in conventional vacuum bagging systems. It is another advantage of various embodiments that, by placing the resin adjacent to the reinforcement 14, rather than below, above, and/or within the reinforcement 14, melting the resin 16 does not result in a re-arrangement and/or wrinkling of the reinforcement 14.

At step 94, the caul plate 44 is optionally positioned. If utilized, the caul plate 44 is disposed relatively above the reinforcement 14 and tends to reduce surface irregularities. In other instances, the caul plate 44 does not appreciably reduce surface irregularities, and thus, may be omitted.

At step 96, the sealant 48 is positioned. For example, a sticky, tacky, or adhesive ribbon or cord-like material may be disposed about a perimeter of the mandrel 18. More particularly, the sealant 48 may be disposed upon the sealant zone 70.

At step 98, the bagging film 46 is positioned. For example, the bagging film 46 may be disposed to extend to or beyond the sealant 48.

At step 100, the sealant 60 is positioned. For example, a sticky, tacky, or adhesive ribbon or cord-like material may be disposed about a perimeter of the resin 16. More particularly, the sealant 60 may be disposed upon the bagging film 46 about the perimeter of the resin 16.

At step 102, the vacuum cup 22 is positioned. For example, the vacuum cup 22 is disposed upon the sealant 60. In addition, at step 102, vacuum lines connecting the vacuum cup 22 to the vacuum generator 26 may be installed.

At step 104, the seal is generated. For example, sufficient force is placed upon the bagging film 46 to form a seal between the bagging film 46 and the sealant 48 and/or between the sealant 48 and the sealant zone 54 of the mandrel 18. In addition, the vacuum cup 22 may be similarly pressed upon the sealant 60 to generate a seal between the vacuum cup 22 and the sealant 60 and/or between the sealant 60 and the bagging film 46.

At step 106, an out gassing procedure may, optionally, be performed. For example, the vacuum generators 24 and 26 may withdraw a portion of the air and/or gas from the envelope 20 and/or the chamber 62. The vacuum pressure may be modulated to generate a negative Δ pressure. In a particular example, such as with the use of thermoset resins, the heater 34 may apply sufficient heat to the resin 16 to reduce the viscosity of the resin 16. The negative Δ pressure may be held for a period of time sufficient to degas the resin 16. For example, the vacuum cup 22 may be transparent to facilitate viewing the resin 16. Upon cessation of bubbling activity, the out gassing procedure may be completed. In other instances, the resin 16 may be sufficiently degassed such that the out gassing procedure is not performed.

At step 108, the layup is infused. In general, infusion occurs in response to the pressure exerted by the bagging film 46 overcoming the resistance of the resin 16 to flowing through the various layers of the layup. More particularly, infusion occurs in response to the following step 110.

At step 110, the Δ pressure is modulated. For example, the $P_{chamber}$ may be raised to generate a positive Δ pressure. In a particular example, the valve 28 may be modulated to stop or reduce the flow of air from the chamber 62 to the vacuum generator 26 and the valve 30 may be modulated to allow a controlled amount of air into the chamber 62. By controlling the Δ pressure, the rate of infusion may be controlled. That is, in conventional infusion systems, uncontrolled infusion may flood the layup with resin that may cause some shifting of the various layers of the reinforcement 14 and the like. It is an advantage of embodiments of the invention, that the rate of infusion may be controlled such that inflow of the resin 16 saturates the infusion media 42 and/or the reinforcement 14 without flooding of the layup. In addition, the BRI device 12 is optionally placed in a pressure vessel such as, for example, an autoclave that facilitates increasing the ambient pressure. In this regard, the heater 34 may include an autoclave to heat the resin 16 and provide an increased ambient pressure.

At step 112, the item 38 is cured. Various resin formulations employ a variety of methods for chemical hardening or polymerization. For example, a group of resins broadly classified as thermoresins or thermoset resins are polymerized by heating. In this regard, sufficient heat and/or pressure is applied the infused resin 16 to facilitate a chemical reaction or polymerization in the resin 16. In other instances, the resin 16 may be polymerized by the addition of a hardener or catalyst. Once mixed with the catalyst, the resin will polymerize given sufficient time. Thus, in another example, sufficient time is allowed to transpire to facilitate polymerization.

Following the method 80, the item 38 may be removed from the BRI device 12 and parted from the layup. Optionally, the item 38 may be finished. Finishing may encompass sanding, polishing, milling, cleaning, or the like.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system comprising:
    a mandrel having a reinforcement zone;
    an infusion medium configured to create a resin flow path from a resin zone to the reinforcement zone;
    an envelope containing the infusion medium and substantially covering the mandrel; and
    a vacuum cup entirely outside of the envelope for controlling pressure at an outer portion of the envelope at the resin zone, wherein the vacuum cup is configured to allow a pressure differential to be applied between the outer portion of the envelope and the resin under the envelope and also to allow pressure on the resin to be controlled independently from a compaction pressure.

2. The system according to claim 1, wherein the envelope includes a bagging film, the system further comprising:
    a sealant to seal the bagging film to the mandrel; and
    a sealant to seal the vacuum cup to the bagging film.

3. The system according to claim 2, further comprising a sealing zone on the mandrel to receive the sealant for sealing the bagging film to the mandrel.

4. The system according to claim 1, further comprising:
    an exit breather for fluid connection to a vacuum source.

5. The system according to claim 4, further comprising a choke zone to reduce any likelihood of the resin being drawn into the exit breather.

6. The system according to claim 1, wherein the resin zone has a concavity for holding a quantity of resin for infusing a reinforcement at the reinforcement zone.

7. The system of claim 1, wherein the vacuum cup is sealed over the envelope at the resin zone.

8. The system of claim 1, wherein the vacuum cup at least reduces the envelope from exerting a compressive force on resin at the resin zone.

9. The system of claim 1, wherein the resin zone and the reinforcement zone are separate but adjacent.

10. The system of claim 1, further comprising a solid or putty-like resin located at the resin zone, the envelope completely covering the resin, the vacuum cup sealed over the envelope and positioned over the resin.

11. The system of claim 1, further comprising a reinforcement at the reinforcement zone.

12. The system of claim 1, wherein the vacuum cup has an open end that is sealed over the envelope.

13. A system comprising:
    a mandrel having a resin zone and a reinforcement zone;
    solid or putty-like resin at the resin zone;
    a reinforcement at the reinforcement zone;
    an infusion medium configured to create a resin flow path from the resin zone to the reinforcement zone;
    an envelope covering the resin, the infusion medium and the reinforcement and substantially covering the mandrel; and
    means, entirely outside of the envelope, for controlling pressure at an outer portion of the envelope over the resin zone, wherein the means is configured to allow a pressure differential to be applied between the outer portion of the envelope and the resin at the resin zone and also to allow pressure on the resin to be controlled independently from a compaction pressure of the envelope on the reinforcement.

* * * * *